United States Patent [19]

Ziegler

[11] Patent Number: 4,744,395

[45] Date of Patent: May 17, 1988

[54] DEVICE FOR DETECTING THE FILLING LEVEL OF A LIQUID IN A CONTAINER

[75] Inventor: Klaus Ziegler, Furtwangen, Fed. Rep. of Germany

[73] Assignee: VDO Adolf Schindling AG, Frankfurt am Main, Fed. Rep. of Germany

[21] Appl. No.: 940,002

[22] Filed: Dec. 10, 1986

[30] Foreign Application Priority Data

Dec. 10, 1985 [DE] Fed. Rep. of Germany ....... 3543529

[51] Int. Cl.⁴ ............................................. B65B 3/04
[52] U.S. Cl. ...................................... 141/95; 141/98; 137/392; 340/614
[58] Field of Search ......................... 33/558; 340/614; 141/95, 198, 98, 94, 96, 1–12, 65, 66; 73/298, 299, 300

[56] References Cited

U.S. PATENT DOCUMENTS 4,633,213 12/1986 Venema .

Primary Examiner—Houston S. Bell, Jr.
Attorney, Agent, or Firm—Martin A. Farber

[57] ABSTRACT

A device for detecting the filling condition in a container has an electro-mechanical transducer 4 secured on a diaphragm 5, by which transducer the diaphragm 5 is set in vibration. An electrical unit energizes the transducer to produce oscillations of the diaphragm 5. The diaphragm 5 has a holder 1 on which the diaphragm 5 is fastened by means of a cylindrical intermediate member 6. The wall thickness of the cylindrical member 6 is a multiple of the thickness of the diaphragm 5.

6 Claims, 1 Drawing Sheet

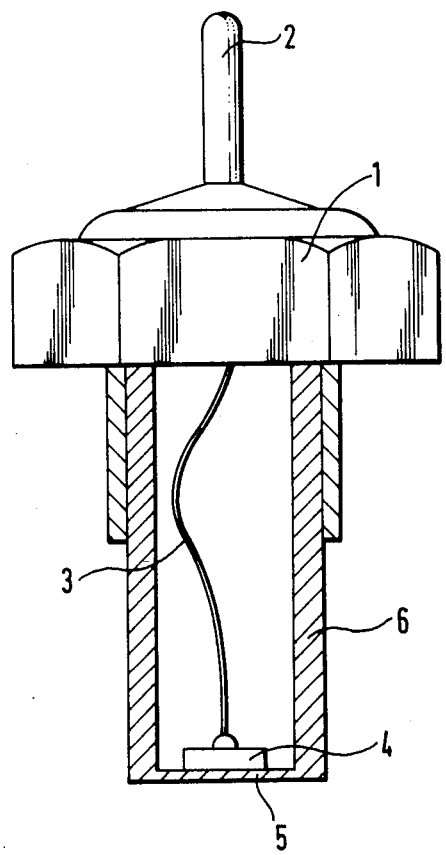

DEVICE FOR DETECTING THE FILLING LEVEL OF A LIQUID IN A CONTAINER

FIELD AND BACKGROUND OF THE INVENTION

The invention relates to a device for detecting a filling level, particularly of a liquid, in a container, by use of an electro-mechanical transducer mounted on a diaphragm. The transducer induces vibrations in the diaphragm in response to energization of the transducer by electrical means. The device includes a holder of the diaphragm on which the diaphragm is secured by means of a cylindrical intermediate member. Since vibrations imparted to the liquid by oscillations of the diaphragm have characteristics dependent on the quantity of liquid in the container, which characteristics are employed by electrical circuitry for measurement of the quantity of liquid.

Such known devices may not have very high resistance against various external influences which act on them. These influences may impair the operation of the device. Such influences result in, for example, distortions of the diaphragm, which may be brought about by temperature fluctuations or by deformation of the fastening of the cylindrical intermediate member to the diaphragm, or the holder. Furthermore, acoustic impairments of the diaphragm can occur, which can impair the measurement.

SUMMARY OF THE INVENTION

It is an object of the invention therefore to provide a device of the foregoing type which, in a simple and inexpensive manner, is provided with a high measuring sensitivity and simultaneous insensitivity to the above-mentioned external influences.

According to the invention, the wall thickness of the cylindrical intermediate member (6) is a multiple of the thickness of the diaphragm (5). This structure provides great rigidity and a great oscillation-controllable mass in the cylindrical intermediate member, whereby external influences are isolated extensively from the sensitive diaphragm.

Simultaneously, also transmission of oscillation from the diaphragm to the cylindrical intermediate member is avoided extensively, because the transmission cross-section from the diaphragm to the intermediate member corresponds to the small thickness of the diaphragm. Consequently the oscillation energy of the electro-mechanical transducer which can be a piezo-electrical component, is concentrated on the diaphragm, without energy removal of consequence from the measurement transducer. Consequently an optimum measurement is made possible.

Preferably the wall thickness of the intermediate member is greater than the thickness of the diaphragm by a factor of two to three.

It is particularly advantageous for decoupling of the diaphragm from the other components of the device that the length of the intermediate member (6) is a multiple of the wall thickness of the intermediate member (6). The longer the cylindrical intermediate member, the smaller are the disturbing influences. The cylindrical intermediate member (6) and the diaphragm (5) can be, by way of example, a one-piece part with cylindrical symmetry. Also the diaphragm can be connected with the cylindrical intermediate member by welding.

A welding connection of high uniformity at all places is achieved when the diaphragm is connected with the cylindrical intermediate member by laser welding.

An equalization of production tolerances as well as a balance of desired values of the device is attained in a simple manner wherein the device is balanced by removal of material from the diaphragm which is connected with the cylindrical intermediate member.

For this, especially a directed cutting of material can be done by means of a laser by erosion, or by grinding.

BRIEF DESCRIPTION OF THE DRAWING

With the above and other objects and advantages in view, the present invention will become more clearly understood in connection with the detailed description of a preferred embodiment, when considered with the accompanying drawing, of which the sole figure is an axial cross-sectional view of a device in accordance with the invention.

DETAILED DESCRIPTION OF THE PREFERRED EMBODIMENT

Referring to the drawing, a device according to the invention has a holder 1 with which the device is held inside a liquid container by being fastened to a wall (not illustrated) of the liquid container. An electrical connection 2 is upstanding on the holder 1 and projects outwardly of the liquid container upon mounting the device within the container. The connection 2 is connected to via a flexible electrical line 3 with an electro-mechanical transducer 4 comprising a piezoelectric element.

Upon assembly of the device, the portion of the device which is directed toward the transducer 4 projects into the liquid container. The transducer 4 is mounted on a diaphragm 5, which diaphragm is connected with the holder 1 by means of a cylindrical intermediate member 6. In this manner, a chamber formed inside the intermediate member 6 is tightly, hermetically sealed-off with respect to the inner chamber of the liquid container.

The wall thickness of the cylindrical intermediate member 6 is relatively large and is approximately four times the thickness of the diaphragm 5, while the length of the intermediate member 6 is about 14 times the wall thickness of the intermediate member 6.

By the large distance of the diaphragm 5 from the holder 1 as well as by the relatively large wall thickness and mass of the cylindrical intermediate member 6, loss of oscillation energy in the diaphragm 5 and consequently to a reduction to the sensitivity of the device, are thereby avoided.

It is to be understood that the above described embodiment of the invention is by way of illustration only and that modifications thereof may occur to those skilled in the art. Accordingly, this invention is not to be regarded as limited to the embodiment disclosed herein, but is to be limited only as defined by the appended claims.

I claim:

1. In a system for detecting a filling level for a liquid in a container, a device mountable on the container for detecting a level during filling, storage and evacuation of liquid of the container, the device having an electro-mechanical transducer mounted on a diaphragm, by which transducer the diaphragm is placed in oscillation, there being electrical means for initiating oscillations of the diaphragm, the device including a holder of the diaphragm and an intermediate cylindrical member, the diaphragm being secured to the holder by means of the intermediate member; the improvement wherein the wall thickness of the cylindrical intermediate member is a multiple of the thickness of the diaphragm to prevent loss of vibrational energy from the diaphragm to the holder.

2. The device according to claim 1, wherein the length of the intermediate member is a multiple of the wall thickness of the intermediate member.

3. The device according to claim 1, wherein the cylindrical intermediate member and the diaphragm are formed as a one-piece part having rotational symmetry about a central axis.

4. The device according to claim 2, wherein said diaphragm is connected with the cylindrical intermediate member by welding.

5. The device according to claim 4, wherein said diaphragm is connected with the cylindrical intermediate member by laser welding.

6. The device according to claim 1, wherein the device can be balanced by a removal of material from the diaphragm at a location of connection with the cylindrical intermediate member.

* * * * *